(12) United States Patent
Birch et al.

(10) Patent No.: US 12,497,049 B2
(45) Date of Patent: Dec. 16, 2025

(54) TRACTION DETERMINATION BY CHANGING WHEEL NORMAL FORCE

(71) Applicant: JAGUAR LAND ROVER LIMITED, Warwickshire (GB)

(72) Inventors: Luke Birch, Coventry (GB); Dennis Lausecker, Coventry (GB); James Kelly, Coventry (GB); Syed Asad Ali, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 266 days.

(21) Appl. No.: 18/254,397

(22) PCT Filed: Nov. 26, 2021

(86) PCT No.: PCT/EP2021/083086
§ 371 (c)(1),
(2) Date: May 25, 2023

(87) PCT Pub. No.: WO2022/112463
PCT Pub. Date: Jun. 2, 2022

(65) Prior Publication Data
US 2024/0001932 A1 Jan. 4, 2024

(30) Foreign Application Priority Data
Nov. 27, 2020 (GB) ..................................... 2018701

(51) Int. Cl.
*B60W 40/068* (2012.01)
*B60G 17/016* (2006.01)
(Continued)

(52) U.S. Cl.
CPC ......... *B60W 40/068* (2013.01); *B60G 17/016* (2013.01); *B60G 17/0195* (2013.01);
(Continued)

(58) Field of Classification Search
None
See application file for complete search history.

(56) References Cited

U.S. PATENT DOCUMENTS 10,988,142 B1 *  4/2021  Mehrotra ............ B60W 40/068
11,453,387 B1 *  9/2022  Huennekens ......... B60W 10/04
(Continued)

FOREIGN PATENT DOCUMENTS

DE  102016220692 A1  4/2018
DE  102018200180 A1  7/2019
(Continued)

OTHER PUBLICATIONS

International Search Report and Written Opinion of the International Searching Authority for International application No. PCT/EP2021/083086 dated Apr. 4, 2022.
(Continued)

*Primary Examiner* — Madison R. Inserra
(74) *Attorney, Agent, or Firm* — Carlson, Gaskey & Olds, P.C.

(57) ABSTRACT

A control system (300) for controlling an active suspension system (104) of a vehicle (100) to determine relative traction levels, the control system comprising one or more controller (301), wherein the control system is configured to (908): control the active suspension system to change normal force through a first subset of one or more wheels; determine a traction-dependent variable at each of the first subset of wheels to which known torque is applied; control the active suspension system to change normal force through a second subset of one or more wheels; and determine a traction-dependent variable at each of the second subset of wheels to which known torque is applied, wherein the traction-dependent variables indicate relative traction levels.

19 Claims, 4 Drawing Sheets

(51) Int. Cl.
*B60G 17/0195* (2006.01)
*B60W 30/18* (2012.01)

(52) U.S. Cl.
CPC .. *B60G 2400/208* (2013.01); *B60G 2400/822* (2013.01); *B60G 2500/106* (2013.01); *B60G 2500/22* (2013.01); *B60W 30/18127* (2013.01); *B60W 2710/18* (2013.01); *B60W 2710/20* (2013.01); *B60W 2710/223* (2013.01); *B60W 2710/226* (2013.01); *B60W 2720/30* (2013.01)

(56) References Cited

U.S. PATENT DOCUMENTS

| | | |
|---|---|---|
| 2007/0027606 A1 | 2/2007 | Fodor et al. |
| 2011/0066326 A1 | 3/2011 | Kashiwamura et al. |
| 2017/0137023 A1* | 5/2017 | Anderson .............. B60G 17/02 |

FOREIGN PATENT DOCUMENTS

| | | |
|---|---|---|
| DE | 102018201462 A1 | 8/2019 |
| DE | 102019105649 A1 | 9/2020 |
| EP | 0378202 A2 | 7/1990 |
| GB | 2465836 A | 6/2010 |
| GB | 2569974 A | 7/2019 |
| JP | H1194661 A | 4/1999 |
| WO | 2020200484 A1 | 10/2020 |

OTHER PUBLICATIONS

Combined Search and Examination Report under Sections 17 and 18(3) for Application No. GB2018701.9 dated Aug. 14, 2021.
Examination Report under Section 18(3) for Application No. GB2018701.9 dated Feb. 13, 2023.

* cited by examiner

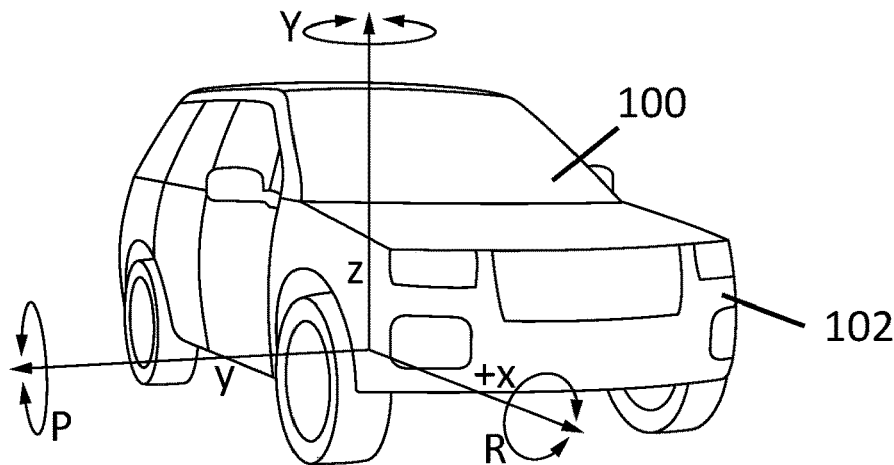
FIG. 1
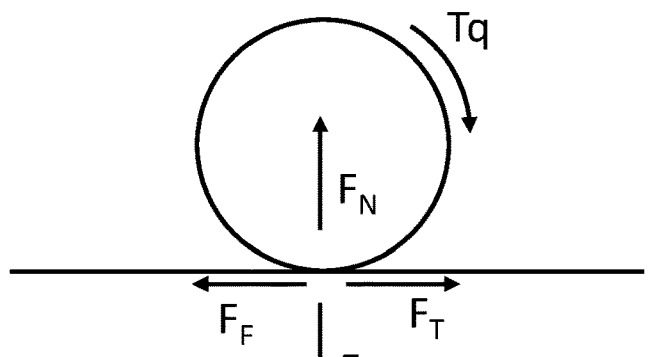
FIG. 2A
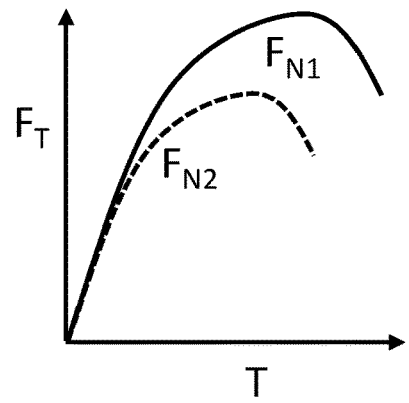
FIG. 2B
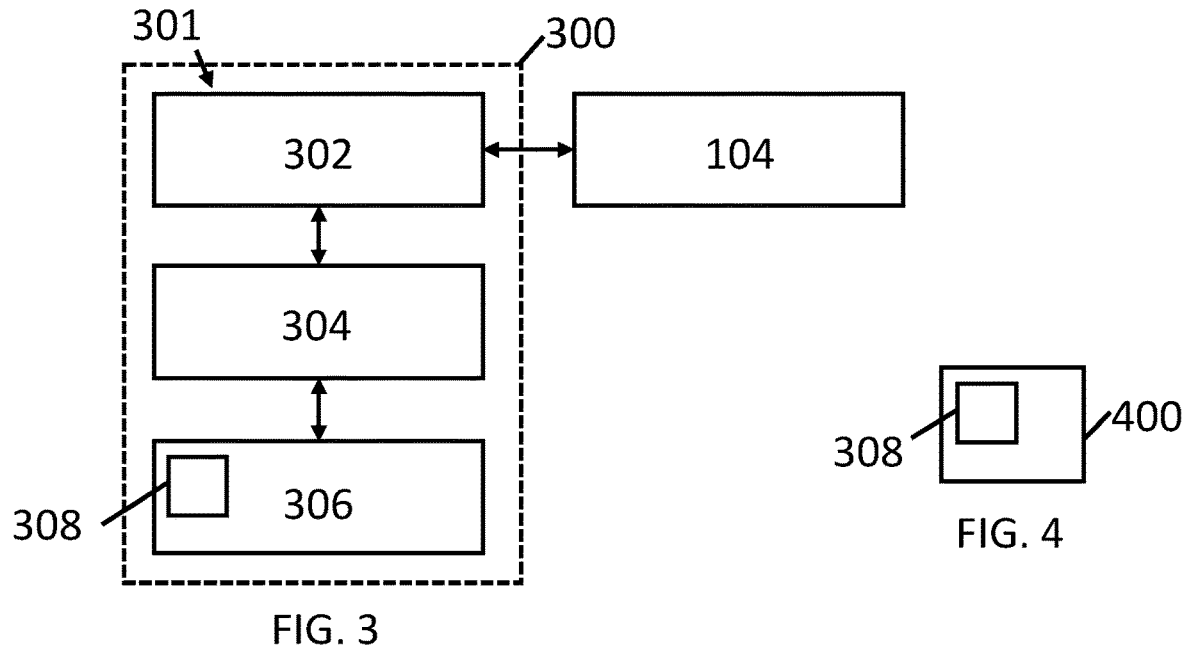
FIG. 3
FIG. 4

TRACTION DETERMINATION BY CHANGING WHEEL NORMAL FORCE

TECHNICAL FIELD

The present disclosure relates to traction determination by changing wheel normal force. In particular, but not exclusively it relates to traction determination by changing wheel normal force of a plurality of wheels of a vehicle.

BACKGROUND

If individual wheels of a vehicle are on surfaces that provide differing coefficients of friction p, options for maximizing traction are limited. Limited slip differentials or locking differentials are mechanisms that prevent or limit differential slip between wheels coupled to the differential, to mitigate the loss of traction through the wheel-to-surface contact patch with the lowest p.

A traction control system can detect wheel slip and reduce the speed of the slipping wheel by applying braking force to that wheel and/or by reducing torque provided by a vehicle powertrain. Braking the slipping wheels will cause torque transfer across a differential to the wheels with greater traction due to mechanical action within the differential.

SUMMARY OF THE INVENTION

It is an aim of the present invention to provide an improved method of measuring traction levels.

According to an aspect of the invention there is provided a control system for controlling an active suspension system of a vehicle to determine relative traction levels, the control system comprising one or more controller, wherein the control system is configured to:
control the active suspension system to change normal force through a first subset of one or more wheels;
determine a traction-dependent variable at each of the first subset of wheels to which known torque is applied;
control the active suspension system to change normal force through a second subset of one or more wheels; and
determine a traction-dependent variable at each of the second subset of wheels to which known torque is applied,
wherein the traction-dependent variables indicate relative traction levels.

In some examples, the traction-dependent variables comprise wheel speed.

In some examples, the control system is configured to obtain an initial approximation of relative traction levels based on wheel speed measurements of the first and second subsets of wheels prior to changing normal force through the first and second subsets of wheels,
wherein the traction-dependent variables determined during the normal force changes refine the initial approximation.

In some examples, the traction-dependent variables are indicative of average traction levels measured over a plurality of repetitive changes of normal force.

In some examples, the first subset of wheels comprises a first pair of wheels at first diagonally-opposite corners of the vehicle, and wherein the second subset of wheels comprises a second pair of wheels at second diagonally-opposite corners of the vehicle.

In some examples, the control system is configured to determine the traction-dependent variables while repetitively pulsing normal force through the first subset of wheels at a first phase and through the second subset of wheels at a second phase.

In some examples, the second phase is approximately 180 degrees offset from the first phase.

In some examples, the first subset is a first wheel at a first corner of the vehicle, and wherein the second subset is a second wheel at a second adjacent corner of the vehicle.

In some examples, the first corner is at a first lateral side of the vehicle and at a first longitudinal end of the vehicle, and wherein the second corner is at a second lateral side of the vehicle and at the first longitudinal end.

In some examples, the control system is configured to:
control the active suspension system to change normal force through a third wheel at the second lateral side and at a second longitudinal end of the vehicle;
determine a traction-dependent variable at the third wheel to which known torque is applied;
control the active suspension system to change normal force through a fourth wheel, wherein the fourth wheel is at the first lateral side and at the second longitudinal end; and
determine a traction-dependent variable at the fourth wheel to which known torque is applied,
wherein the traction-dependent variables at the first, second, third and fourth wheels indicate relative traction levels between the first, second, third and fourth wheels.

In some examples, the control system is configured to determine the traction-dependent variables while repetitively pulsing normal force through the first wheel at a first phase, through the second wheel at a second phase, through the third wheel at a third phase, and through the fourth wheel at a fourth phase.

In some examples, the second phase is approximately 90 degrees behind the first phase, wherein the third phase is approximately degrees behind the second phase, and wherein the fourth phase is approximately 90 degrees behind the third phase.

In some examples, changing normal force comprises repetitively pulsing normal force at a rate corresponding to a frequency between approximately 0.25 Hz and approximately 15 Hz.

In some examples, the control system is configured to calculate the rate for each subset of wheels, comprising compensating for differences between at least one of:
weight onto each wheel;
ride height at each wheel; and
tyre pressure at each wheel.

In some examples, changing normal force comprises repetitively pulsing normal force outside a wheel-hop inducing range.

In some examples, the control system is configured to enable the changing of normal forces and the determinations of the traction-dependent variables in dependence on a received indication of a loss of traction of the vehicle.

In some examples, the indication of a loss of traction of the vehicle is based on information from wheel speed sensors.

In some examples, the control system is configured to enable the changing of normal forces and the determinations of the traction-dependent variables in dependence on received surface information.

In some examples, the surface information is dependent on one or more of:
a selected terrain mode of the vehicle; and
information obtained from one or more sensors.

In some examples, the control system is configured to, in dependence on the relative traction levels, cause at least one of the following:
  controlling torque provided to wheels;
  controlling friction braking at the wheels;
  controlling an active suspension spring rate;
  controlling an active suspension damping rate;
  controlling a regenerative braking setting;
  controlling steering at steerable wheels; or
  controlling selection of a terrain mode.

According to an aspect of the invention there is provided an active suspension system comprising the control system.

According to an aspect of the invention there is provided a vehicle comprising the control system or the active suspension system.

According to an aspect of the invention there is provided a method of controlling an active suspension system of a vehicle to determine relative traction levels, the method comprising:
  controlling the active suspension system to change normal force through a first subset of one or more wheels;
  determining a traction-dependent variable at each of the first subset of wheels to which known torque is applied;
  controlling the active suspension system to change normal force through a second subset of one or more wheels; and
  determining a traction-dependent variable at each of the second subset of wheels to which known torque is applied, wherein the traction-dependent variables indicate relative traction levels.

According to an aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example vehicle and a coordinate system;

FIGS. 2A, 2B illustrate forces acting on a wheel and a road;

FIG. 3 illustrates an example control system;

FIG. 4 illustrates an example of a non-transitory computer-readable storage medium;

DETAILED DESCRIPTION

Figure 5:
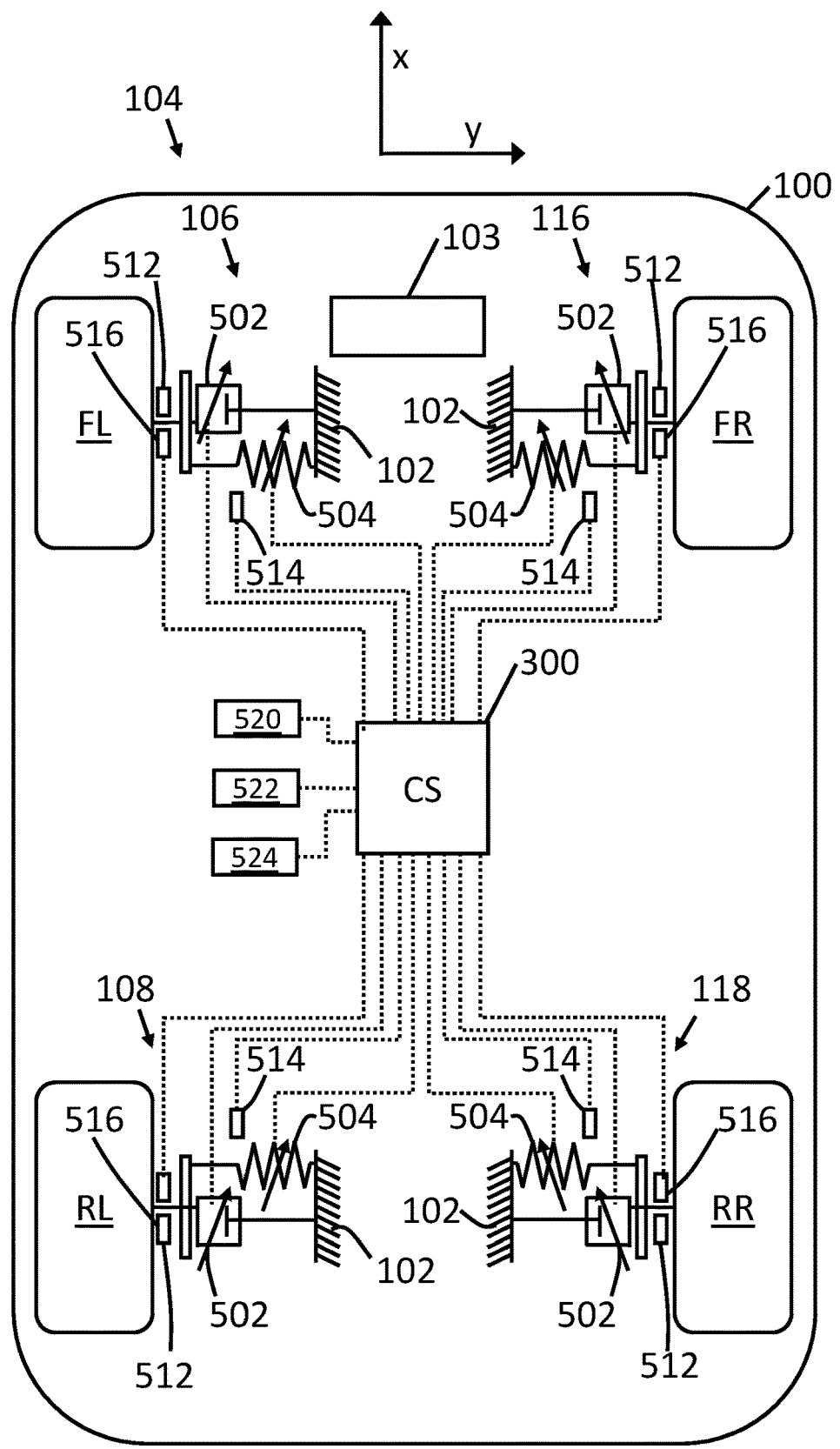
FIG. 5 illustrates an example of an active suspension system of a vehicle.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles. The vehicle 100 has a vehicle body 102 (sprung mass) supported by a suspension.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

FIG. 2A schematically illustrates a wheel and a road surface, and forces acting on the wheel and on the road. $F_T$ is tractive force which depends on torque Tq applied by a torque source such as an internal combustion engine or electric machine, and depends on usable traction. $F_{N1}$ is friction force. $F_W$ is the weight of the vehicle 100 supported by that wheel, referred to as corner weight if the vehicle 100 has one wheel at each corner. $F_N$ is the normal force equal and opposite to the weight $F_W$. Normal force is also referred to as wheel-to-surface contact patch force herein.

FIG. 2B is a graph with tractive force $F_T$ on the y-axis and applied torque Tq on the x-axis. The solid line in FIG. 2B illustrates for a given normal force $F_{N1}$ the tractive force $F_T$ increases proportionally to applied torque Tq up to a usable traction limit. Above the limit, a further increase of torque Tq will provide less additional tractive force $F_T$ due to onset of wheel slip. With increasing torque and therefore wheel slip rate, the tractive force $F_T$ will start to fall because dynamic friction is less than static friction.

However, if the normal force decreases to $F_{N2}$ (dashed line) the usable traction limit decreases. This can cause earlier onset of wheel slip and loss of traction. This relationship between normal force and wheel slip can be exploited to obtain information about relative traction levels. For example, if a loss of traction occurs during driving, the normal force through a wheel could be temporarily reduced if vehicle weight can be temporarily redistributed to other wheels. The consequent change of wheel slip of the unloaded (unweighted) wheel can be measured, and then a different wheel(s) can be unloaded and measured. The wheels that slip more as a result of unloading are the wheels with lowest traction. The relative traction levels of the wheels can therefore be ranked worst to best. This indication of relative traction levels can be sent to other vehicle subsystems to help the vehicle 100 to maintain traction or get unstuck.

The suspension of the vehicle 100 is an active suspension system able to momentarily change the normal force $F_N$ through individual wheels of the vehicle 100, to change traction at those wheels. An active suspension system 104 is a system to which energy can be supplied under the control of a control system 300 such as the one shown in FIG. 3, so as to vary the normal force at the wheels of the vehicle. By adding energy to increase actuator force (the force for increasing wheel-to-body distance) at a corner of the vehicle 100 relative to other corners, the weight balance of the vehicle 100 shifts so that more of its weight is supported by some wheels than others. This enables different wheels of the vehicle 100 to be unloaded so that the slip can be measured.

An example active suspension system 104 and the control system 300 will first be described.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components such as the active suspension system 104.

FIG. 4 illustrates a non-transitory computer-readable storage medium 400 comprising the instructions 308 (computer software).

FIG. 5 illustrates an example implementation of the active suspension system 104.

The active suspension system 104 comprises front left active suspension 106 for a front left wheel FL, front right active suspension 116 for a front right wheel FR, rear left active suspension 108 for a rear left wheel RL, and rear right active suspension 118 for a rear right wheel RR. The active suspension for each wheel (e.g. quarter/corner) of the vehicle 100 may be individually controllable.

FIG. 5 also shows a torque source 103 such as an internal combustion engine or electric machine, for driving at least some of the vehicle wheels. In some examples the vehicle 100 is an all-wheel drive vehicle. In one implementation all wheels are coupled to one torque source such as an internal combustion engine. In another implementation the vehicle is a 'through the road hybrid' vehicle configured for a first torque source (e.g. internal combustion engine) to provide torque to one axle (e.g. both front wheels or both rear wheels) and for a second torque source (e.g. electric machine) to provide torque to a second axle (e.g. both rear wheels or both front wheels). Alternatively, the first and second torque sources are the same type of torque source. In a further implementation the vehicle comprises a torque source (typically an electric machine) for each wheel, such as wheel hub electric machines. Possible vehicle architectures are not limited to the above examples.

The active suspension for each corner of the vehicle 100 comprises an actuator 502.

The actuator 502 may be a hydraulic actuator such as a hydraulic fluid-filled chamber containing a piston. One end of the actuator 502 is coupled to a vehicle wheel and the other end is coupled to the vehicle body 102. A spring 504 (e.g. coil or pneumatic) may be in equilibrium and acting in parallel with the actuator 502.

When the vehicle suspension is undisturbed, the piston of the hydraulic actuator 502 sits at a particular neutral position in the chamber.

The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added to and/or extracted from the actuator 502 by pumping fluid and/or controlling valves to regulate fluid pressure to either side of the piston.

Therefore, a control system 300 can dynamically control restoring force against the displaced piston. This force is equivalent to spring force (spring rate) of a coil spring against displacement. Dynamic control enables the force-displacement relationship to be changed to adapt to a driving scenario. Energy can be added or removed quickly, e.g. within tens of milliseconds. In order to control spring force, the control system 300 may output a force request that is dependent on sensed wheel travel (wheel-to-body displacement/articulation).

A damping rate of the actuator 502 can be modified by controlling a fluid valve at a constriction, which regulates the rate at which fluid is transferred in and out of the actuator 502 by movement of the piston. Bump and rebound damping rates could be controlled independently in some examples.

Further, energy can be added to or removed from the actuator 502 in order to vary the normal force applied to the tyre contact patch associated with that actuator 502. This variation in force may result in an extension or retraction of the actuator 502. In FIG. 5 this enables the wheel-to-body distance to be changed independently at different ends and/or at different corners of the vehicle 100.

The above example refers to a hydraulic actuator 502, and in other embodiments the actuator may be an electromagnetic actuator or a pneumatic actuator, or the like.

In FIG. 5 but not necessarily all examples, the spring 504 comprises an active spring such as a pneumatic spring, enabling control of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Energy can be added to or removed from the pneumatic spring 504 in order to increase or decrease the volume of the pneumatic spring 504. Increasing the volume can lift the vehicle body 102 in the z-axis. In FIG. 5 this enables the wheel-to-body distance to be changed independently at different ends and/or at different corners of the vehicle 100.

Additionally or alternatively, the spring 504 comprises a passive spring (e.g. coil) or is omitted entirely.

Control of the active suspension system 104 relies on one or more sensors. Wheel travel may be sensed by a wheel-to-body displacement sensor 514 (suspension displacement-based sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

In some examples, the control system 300 more accurately determines the wheel travel and/or its associated derivatives by fusing information from the wheel-to-body displacement sensor 514 with information from hub accelerometers.

Pressure in the pneumatic spring 504 can be sensed to indicate weight onto the wheel.

In at least some examples the control system 300 is configured to control the active suspension system 104 by transmitting a force request to the active suspension or to a low-level controller thereof. The force request may be an arbitrated force request based on requests from various requestors and information from various sensors.

FIG. 5 illustrates additional optional features that may interact with the control system 300 to influence force request calculation.

These include any one or more of:
- A wheel speed sensor 512 for each wheel. In an example implementation, the wheel speed sensor 512 is part of an antilock braking system (ABS).
- A hub-mounted accelerometer 516 for each wheel, coupled to the unsprung mass of the vehicle 100.
- A human-machine interface (HMI) 520. This refers to any of the various input devices and input/output devices available to the driver such as touchscreens, displays, hardware switches/sliders/selectors or the like.
- At least one vehicle body accelerometer 522 coupled to the vehicle body 102 (sprung mass). A particular example includes a 3DOF or 6DOF inertial measurement unit (IMU). A unit may comprise an accelerometer or a multi-axis set of accelerometers.
- A tyre pressure monitoring system (TPMS) 524 comprising tyre pressure monitors for each wheel.

FIGS. 6A-8 illustrate example implementations for traction estimation:

FIGS. 6A-7E illustrate examples of an estimation function that determines relative traction levels, for example which wheels (corners/contact patches) have the most grip (traction). The estimation function controls the active suspension system to change (e.g. pulse/oscillate) the normal force and measure the effect of the change on a traction indicator such as wheel speed (spin).

Figure 8:
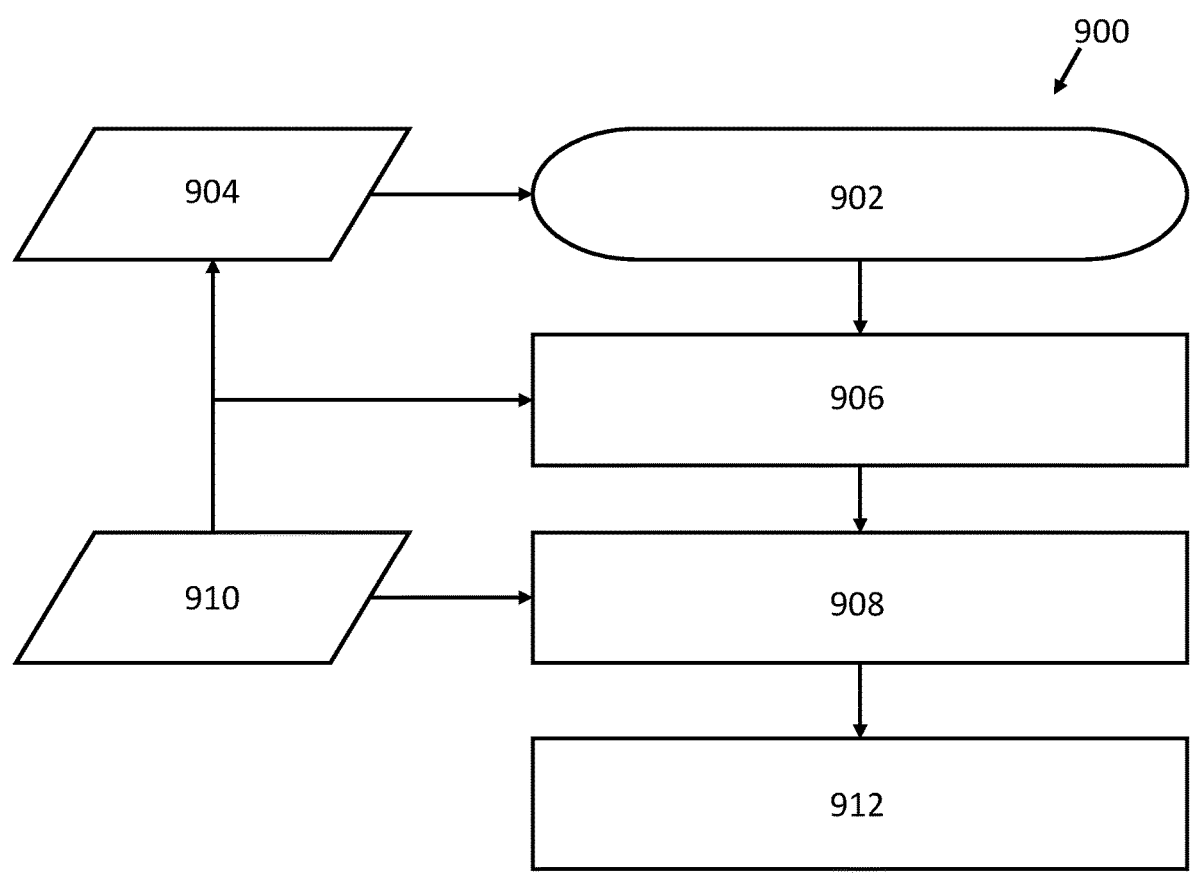
FIG. 8 illustrates an example method.

FIG. 8 illustrates an example control method.

The estimation function is described first with reference to various embodiments. FIGS. 6A-7E provide examples of the estimation function that enables the wheel(s) with highest traction to be identified, by modifying the weight balance of the vehicle 100 to obtain information indicative of relative traction levels. This comprises:
- controlling the active suspension system 104 to change normal force (e.g. oscillating actuator extension and retraction) through a first subset of one or more wheels;
- determining a traction-dependent variable (e.g. wheel speed or its derivative) at each of the first subset of wheels to which known torque (e.g. measured constant or variable torque request) is applied while changing normal force;
- controlling the active suspension system 104 to change normal force (e.g. oscillating actuator extension and retraction) through second subset of one or more wheels; and
- determining a traction-dependent variable (e.g. wheel speed or its derivative) at each of the second subset of wheels to which known torque (e.g. measured constant or variable torque request) is applied while changing normal force.

The control system 300 can then evaluate the effect of a known change (known actuator force/torque request) of normal force on the wheel speed or derivative of wheel speed. If the change of normal force causes the wheel to slip at a different speed, or causes the wheel acceleration to change, or causes a transition between slipping and not slipping (break traction or regain traction), then wheel speed will change relative to the other wheel speeds in a manner that indicates the usable traction of that wheel.

If the vehicle 100 comprises an active differential, the control system 300 may at least partially unlock the active differential during the measurement of the traction-dependent variables, and then return the active differential to its previous relatively locked state.

If the vehicle 100 comprises hub electric machines with a single electric machine driving each wheel, the control system 300 may apply constant torque to each electric machine during the measurement of the traction-dependent variables.

The exact traction does not necessarily need to be known, as long as the relative traction levels of different wheels are ascertainable. For example, the control system 300 could rank the wheel traction levels between best and worst based on how their traction-dependent variables were affected. Methods include, but are not limited to comparing average wheel speeds or maximum wheel speeds or maximum wheel speed rates of change of each wheel. The parameter of interest can be indicative of the speed differential across each axle.

There are various ways in which the normal force could be changed to enable the relative traction estimation. The change could be:
- a steady state decrease by lifting a wheel towards the vehicle body 102;
- a steady state increase by pushing a wheel away from the vehicle body 102; or
- oscillation (pulsing) between decreasing and increasing, as illustrated in FIGS. 6A-7E which will now be described.

Figure 6A:
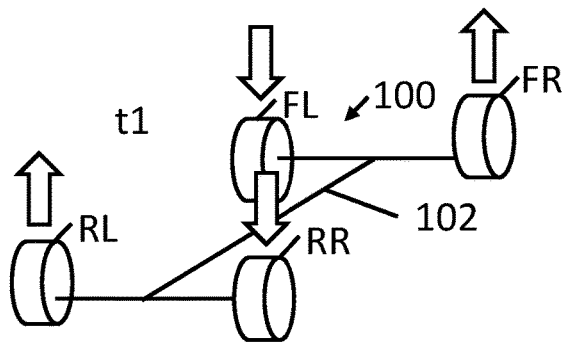
FIGS. 6A, 6B, 6C illustrate an example of diagonal out-of-phase normal force variation for estimating relative traction levels.
Figure 6B:
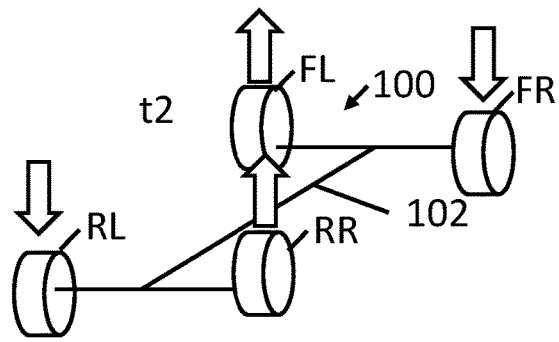
Figure 6C:
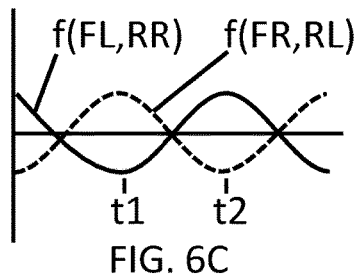

FIGS. 6A-6C illustrate a first example of the actuator-based traction estimation. FIGS. 6A, 6B are schematic illustrations of the vehicle wheels FL, FR, RL, RR and vehicle body 102 at different times.

In this example, actuators 502 are controlled to vertically pulse a first subset (pair) of wheels at first diagonally-opposite corners of the vehicle 100 at a first phase, and a second subset (pair) of wheels at second diagonally-opposite corners of the vehicle 100 at a second phase, in this case approximately 180 degrees out of phase. Therefore, one wheel is lifted/pulled (unweighted/unloaded) while the other wheel is pushed (weighted/loaded).

While the vertical pulsing occurs, the traction-dependent variables are measured while the known torque is applied. The 'known torque' is known to the control system 300. The known torque can either be based on a driver-requested torque or an automatically-requested torque. The torque can be expressed as a torque request, a force request, a pedal position or the like. If the torque is variable, the control system 300 may receive an indication of the torque request, to ensure that the evaluation of the traction-dependent parameters compensates for any differences in the torque request at the time that the traction-dependent variable of each wheel was estimated. If the torque is fixed during the estimation, the control system can itself request a predetermined or arbitrary value of the torque request, that is known to be maintained throughout the estimation.

FIG. 6A illustrates the state of the wheels at a first time t1, wherein the front right wheel FR and rear left wheel FL are pulled upwards as a diagonal pair while the front left wheel FL and rear right wheel RR are pushed downwards as a diagonal pair.

FIG. 6B illustrates the state of the wheels at a second time t2, wherein the front right wheel FR and rear left wheel FL are pushed downwards as a diagonal pair while the front left wheel FL and rear right wheel RR are pulled upwards as a diagonal pair.

In some, but not necessarily all examples the pattern is approximately sinusoidal for smoothness, as shown in the amplitude (A)-time (t) graph of FIG. 6C. In other examples the waveform is different or is a sequence of discontinuous pulses.

In some examples the pattern has a predetermined frequency. FIG. 6C shows that one diagonal pair of wheels FR, RL is pulsed at a first frequency f(FR, RL) and the other diagonal pair of wheels is pulsed at a frequency f(FL, RR) which is approximately the same as the first frequency. However, it would be appreciated that the frequencies do not have to match.

FIG. 6C also shows that the waveforms are 180 degrees out of phase, so one pair of wheels is at maximum weighting/loading while the other pair of wheels is at maximum unweighting/unloading. It will be appreciated that whilst force is varied by the actuators 502, it is still desirable in many situations, to maintain tyre to surface contact at all corners. As such, the wheel-to-body displacement changes can be relatively small, which is advantageous as it tends not to cause uncomfortable disturbances in vehicle body motion or damage to the surface over which the vehicle is travelling.

In an example the frequency (first frequency) during estimation is at least approximately 0.25 Hz. The frequency can be no more than approximately 15 Hz.

The appropriate amplitude of oscillation is another parameter that can be controlled. At least if the vehicle 100 is moving, the frequency and amplitude may be controlled to be outside a wheel hop-inducing range. Therefore, the wheels remain in continuous contact with the ground.

The selection of diagonal pairs and a 180-degree phase offset together help to maintain vehicle body composure during the estimation, to minimize vehicle body roll or pitch.

The estimation may comprise measuring wheel slip (based on relative wheel speeds) to determine which diagonal pair has the most overall traction. The estimation may further comprise measuring the relative wheel speeds within each diagonal pair to identify the wheel with the best traction. The estimation may identify the wheel or subset of wheels with the best traction.

The estimation may be repeated for each oscillation/pulsation cycle. More than one pulsation improves confidence, for instance the confidence of an average wheel slip/average peak wheel slip. After a required number of pulsation cycles, the pulsation ends.

An alternative implementation of FIGS. 6A-6C is to push a first diagonal pair of wheels downward without pulling the other pair upward, and then push the other pair of wheels downward without pulling the first pair upward. That is, the estimations are performed consecutively rather than concurrently.

In another embodiment the lateral wheels FL, FR at opposite lateral sides of the vehicle 100 are pulsed consecutively or concurrently 180 degrees out-of-phase, and the wheels RL, RR at the other longitudinal end of the vehicle 100 are not pulsed. In a further embodiment the rear wheels RL, RR are pulsed but not the front wheels FL, FR, for instance if the vehicle 100 is configured for rear-wheel drive. The opposite would apply for a front-wheel drive arrangement. In such two-wheel drive arrangements, the speeds of the non-driven wheels of the vehicle 100 could be measured to provide an accurate indication of vehicle speed over ground. In a further embodiment the vehicle 100 is rolled side to side or pitched up and down, by changing normal force at wheels concurrently or in an out-of-phase oscillating/pulsing pattern. The illustrated diagonal pattern is most advantageous for vehicle body composure.

FIGS. 7A-7E illustrate another estimation embodiment in which individual wheels are pulsed in a rotating gimballing pattern or sequence, either clockwise or anticlockwise, around the vehicle.

Figure 7A:
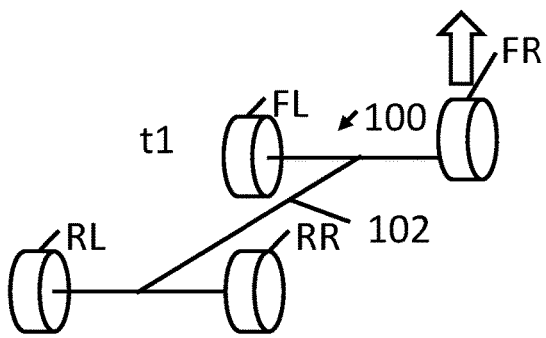
FIGS. 7A, 7B, 7C, 7D, 7E illustrate an example of 90-degree out-of-phase normal force variation for estimating relative traction levels.

In FIG. 7A at time t1 a first wheel FR is pulsed at a first phase, wherein the first wheel is at a first lateral side (right) of the vehicle 100 and at a first longitudinal end (front) of the vehicle 100.

Figure 7B:
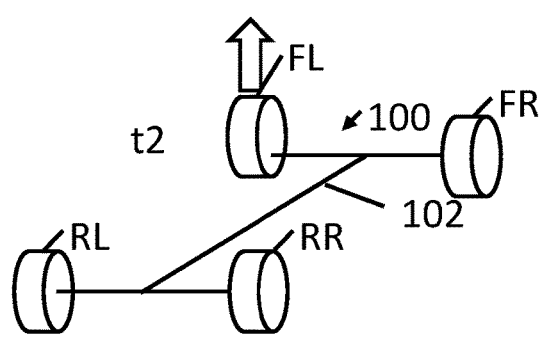

In FIG. 7B at time t2 a second wheel FL is pulsed at a second phase behind the first phase, wherein the second wheel is at a second lateral side (left) of the vehicle 100 and at the first longitudinal end (front).

Figure 7C:
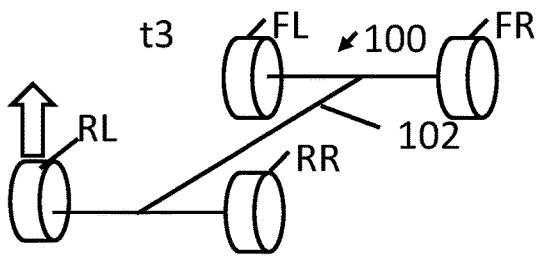

In FIG. 7C at time t3 a third wheel RL is pulsed at a third phase behind the second phase, wherein the third wheel is at the second lateral side (left) and at a second longitudinal end (rear) of the vehicle 100.

Figure 7D:
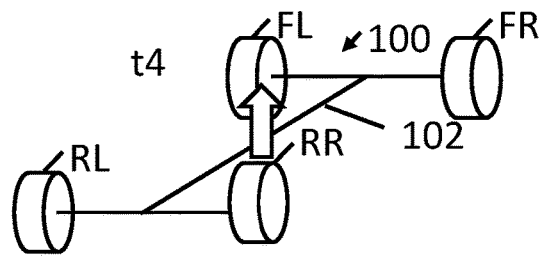

In FIG. 7D at time t4 a fourth wheel RR is pulsed at a fourth phase behind the third phase, wherein the fourth wheel is at the first lateral side (right) and at the second longitudinal end (rear).

Figure 7E:
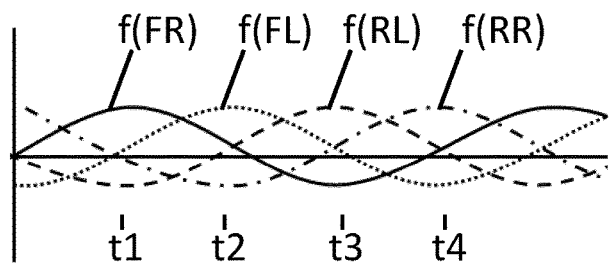

As shown in FIG. 7E, the first to fourth phases may be approximately 90 degrees behind each other to provide uniformly rotating contact patch force variation around the vehicle. The frequencies f(FR), f(FL), f(RL), f(RR) may be approximately the same frequency or frequencies as each other.

The gimballing motion helps to maintain vehicle body composure, so that vehicle body motion is neither pure roll nor pure pitch.

In an alternative embodiment the individual wheels are pulsed/displaced sequentially rather than concurrently out-of-phase. That is, the next wheel may be pulsed/displaced after the previous wheel has returned to its normal target position or target normal force.

The gimballing pattern enables wheel slip estimations to be performed for each pulsated wheel, and relative traction levels to be obtained.

Once estimation is complete, an implementation phase is entered in which the control system 300 causes a mitigation action to help the vehicle 100 to maintain traction or get unstuck. Examples of the implementation phase are given later with respect to operation 912 of FIG. 8.

FIG. 9 is a flowchart illustrating an example control method 900 for traction estimation, implemented by the control system 300.

The method 900 starts at operation 902 in which the method 900 is enabled. Enabling the method 900 may optionally require that one or more inhibit conditions are not active, dependent on one or more of:

Vehicle speed. For example, the method 900 may not be enabled while the vehicle 100 is travelling faster than a threshold speed, the threshold speed having a value between approximately 5 m/s and approximately 15 m/s. The method 900 could be available during attempted vehicle pullaway from stationary, in some examples.

A vehicle stability system intervention inhibit condition.

A manually configurable enable/disable setting via HMI 520.

A failure or inhibit signal from a controller of the active suspension system 104, for example indicating a failure condition or excessive temperature.

Surface information as described below.

A blend function associated with the speed-based inhibit condition could allow the amplitudes of the force requests to the active suspension system 104 to increase as vehicle speed falls and to decrease as vehicle speed rises, to avoid noticeable binary behaviour. The blend function can have the threshold speed as its upper limit and can have a lower limit speed below which the method 900 is fully enabled. In an example, the lower limit is between 1 metre per second and 10 metres per second slower than the upper limit.

An example inhibit condition based on surface information checks surface information data block 904. The surface information may comprise a selected terrain mode and/or information from one or more sensors from data block 910. Terrain modes are defined at the end of the specification. In an example the method 900 may determine whether the vehicle 100 is in a first terrain mode or a second terrain mode. If the vehicle 100 is in a first terrain mode the method 900 does not proceed. If the vehicle 100 is in a second terrain mode the method 900 proceeds. In one embodiment the first terrain mode is an on-road mode and the second terrain mode is an off-road mode.

At operation 906 a trigger condition is satisfied for starting the estimation phase. In an example, the trigger condition is based on receiving an indication of loss of traction of the vehicle 100, for example wheel slip above a threshold and/or vehicle speed deviating from a setpoint. The loss of traction could be global or limited to one or more individual wheels.

Additionally, or alternatively, the trigger condition can require determination of a deviation of vehicle progress from expected vehicle progress. Determining a deviation from expected progress can comprise receiving feedback indicative of expected vehicle progress. If the vehicle is being manually driven, the feedback can indicate a measured magnitude and/or rate of change of driver-requested braking relative to a threshold and/or can indicate a measured magnitude and/or rate of change of driver-requested torque relative to a threshold. This is because excessive driver use of a brake/accelerator can indicate driver dissatisfaction with a current rate of progress. If the vehicle is being autonomously driven, the feedback can indicate deviation of vehicle speed from a speed setpoint.

The above example is reactive. In some examples a pre-emptive check can be performed in addition to or instead of the reactive trigger. An example pre-emptive check comprises evaluating surface information from one or more sensors configured to detect a deformable/granular surface, such as a radar sensor, a lidar sensor, an ultrasonic sensor or a visual light camera.

In some examples the triggering of the estimation phase depends on driver intent. The trigger condition may further require an indication of intended vehicle motion (e.g. torque request above a threshold and/or speed setpoint in place).

At operation 908 the estimation phase is performed for example by estimating relative traction levels while changing normal force through wheels. In an example implementation the control system 300 starts with an initial approximation based on wheel slip estimation, and then pulses the wheels as described in relation to FIGS. 6A to 7E to provide additional confidence.

At operation 908 the characteristics (amplitude/frequency) of the pulsation pattern for the estimation phase are determined first.

In an example, global and local characteristics of the pulsation pattern are determined. Global characteristics govern a common amplitude and frequency target for all wheels. Local characteristics modify the force request for individual corners, to compensate for differences in suspension characteristics.

When calculating the local characteristics for individual corners, various differences between the corners may be taken into account. The suspensions of individual corners have a natural frequency which depends on the stiffnesses of deformable elements such as actuators 502, springs and tyres, and also depends on the sprung mass onto the wheel which varies between corners. While left-to-right differences may be minimal, front-to-rear differences may exist. The rear suspension may have a higher frequency than front suspension, for improving vehicle body composure at speed.

Therefore, the force request to each corner may require a force request frequency not necessarily matching the natural frequency of each corner, to ensure that the resulting frequency of pulsation from the wheel perspective is the same at different corners of the vehicle 100.

Accordingly, one or more variables may be taken into account when determining the force requests for individual corners (individual actuators 502).

Firstly, sprung mass could be estimated for a given corner. One method of estimating sprung mass is to measure steady-state pneumatic pressure/hydraulic pressure in the actuator 502 or spring 504, which is a function of weight.

Secondly, as wheel rate may be affected by ride height, a ride height-dependent parameter may be taken into account. In an example, the ride height-dependent parameter comprises a requested ride height or measured ride height (e.g. measured by wheel-to-body displacement sensors 514).

Thirdly, tyre pressure monitoring data from the TMPS 524 could be employed, to account for any deflation of the tyres and resulting reduction of natural frequency. This is useful in case the driver has let some air out of their tyres to aid progress. Tyre pressure indications for each tyre may be received by the control system 300. A tyre pressure gain function may compensate for differences in tyre pressure between different tyres, to ensure the resulting waveforms are as shown in FIG. 6C or 7E.

Once the estimation phase is completed, the implementation phase is performed at operation 912 based on the traction-dependent variables. In an example step 912 sees the control of a vehicle subsystem based on the relative traction levels. Estimation and implementation may not happen concurrently.

The implementation phase may comprise controlling at least one of the following parameters as a mitigation action: controlling torque provided to wheels; controlling friction braking provided to wheels; controlling an active suspension spring rate; controlling an active suspension damping rate; controlling a regenerative braking setting; controlling steering of steerable wheels; or controlling selection of a terrain mode.

An advantage of knowing the relative traction levels is that the mitigation action can comprise controlling a parameter locally, i.e. individually for individual subsets of one or more wheels. Examples are provided below.

It would be appreciated that some mitigation actions can comprise controlling a parameter globally, comprising a common parameter change to all wheels. A global mitigation action can be dependent on a global traction-dependent parameter calculated from the traction-dependent variables of the individual wheels. A global traction-dependent parameter can comprise, for instance, a slip index. Some mitigation actions can control both a global parameter and a local parameter.

Pulsed/slow wheel rotation: In some examples, a local or global mitigation action of controlling torque provided to the wheels can comprise controlling at least one torque source 103 to rotate at least one wheel of the vehicle at a predetermined speed and/or rate of change in dependence on the relative traction levels and/or global traction-dependent parameter. Wheel speeds/rates could be controlled individually if the vehicle 100 has multiple torque sources coupled to different wheels, and/or has an active differential. An example implementation is pulsed wheel rotation and/or slow wheel rotation. Slow rotation can compact loose material under the wheel rather than dispersing it in front of or behind the wheel. The wheel speed can be maintained within a target recovery speed range, e.g. corresponding to a vehicle speed 1 km/h or 5 km/h. This pulsed/slow wheel rotation could be performed for particular surfaces such as sand (e.g. sand terrain mode) but not other surfaces, e.g. in dependence on surface information.

Torque redistribution: In some examples, a local mitigation action of controlling torque provided to the wheels can individually control the torque provided to individual subsets of wheels to change a torque distribution, in dependence on the relative traction levels. The mitigation action can reduce the torque provided to one or more wheels estimated to be low-traction wheels, or increase the torque provided to one or more other wheels estimated to be high-traction wheels, or a concurrent combination thereof. Torque can be redistributed if the vehicle 100 has multiple torque sources coupled to different wheels, and/or has an active differential. Otherwise, friction brakes could be controlled to provide the same effect (described later).

Global torque change: In some examples, a global mitigation action of controlling torque provided to all driven wheels can comprise lowering a net torque request applying to all driven wheels to reduce wheel slip of all the driven wheels, in dependence on the global traction-dependent parameter.

Throttle mapping: In some examples, a global mitigation action of controlling torque provided to all driven wheels can comprise controlling a throttle map (throttle position map) in dependence on the global traction-dependent parameter. Controlling a throttle map can comprise changing a function relating the position of an accelerator (e.g. accelerator pedal) to an output driver torque request. The change may aid traction by requiring additional accelerator travel to yield the same output driver torque request, over a range of values of accelerator position. This gives the driver more control.

Throttle response: In some examples, a global mitigation action of controlling torque provided to all driven wheels can comprise controlling throttle response (accelerator response) in dependence on the global traction-dependent parameter. Controlling throttle response can comprise changing the value of a torque rate limiter. If a rate of change of a torque request exceeds a predetermined rate limit, the torque rate limiter may lower a value of the torque request to reduce or eliminate exceedance of the predetermined rate limit. The change may aid traction by reducing throttle responsiveness, for example by reducing the value of the predetermined rate limit.

Gear shifts: In some examples, a global mitigation action of controlling torque provided to all driven wheels can comprise controlling a gear shift in dependence on the global traction-dependent parameter. Controlling a gear shift can comprise changing a gear shift map. A gear shift map determines one or more shift points for changing gears in a transmission, based on vehicle speed and based on torque provided to the wheels. Changing a gear shift map can comprise raising/lowering one or more shift points to aid traction. In some examples, the shift points can be modified to hold a higher gear (lower gear reduction from torque source to wheels) for longer so as to reduce wheel torque. In some examples, the shift points can be modified to hold a current gear for longer so as to maintain a continuous torque delivery, e.g. not dipping as the gear is changed. Requesting a gear change can comprise requesting a transmission gear that provides a lower gear reduction from the torque source to the wheels.

Friction braking: In some examples, a local or global mitigation action of controlling friction braking can comprise controlling the friction braking at one or more wheels, by a set of frictional brakes (e.g. disc brakes). This method of controlling friction braking can provide the effect of pulsed/slow wheel rotation as described earlier, and/or torque redistribution as described earlier. The friction braking could be controlled concurrently with, or instead of controlling torque provided to the wheels.

In some examples, an anti-lock braking system parameter can be changed for the low-traction wheels relative to the high-traction wheels.

In some examples, a wheel with below-threshold traction can be fully braked and unable to rotate, so that maximum torque is transmitted through a differential to another wheel with higher traction.

Regenerative braking: Additionally, or alternatively, a regenerative braking setting can be controlled such as a regenerative braking magnitude, to at least partially achieve the same goal as controlling friction braking.

Spring rate: In some examples, a local or global mitigation action of controlling active suspension spring rate can comprise controlling the actuators 502 and/or the springs 504 of the active suspension system 104 to modify spring rates. Regarding the actuators 502, the mitigation action can change a relationship between sensed wheel travel and a force request of the active suspension system, for example by changing a gain parameter.

Local spring rate changes: The spring rates can be changed differently for different wheels. For example, the mitigation action can increase/decrease spring rate at a subset of one or more wheels estimated to be low-traction wheels based on the relative traction levels, or can decrease/increase spring rate at a subset of one or more wheels estimated to be high-traction wheels based on the relative traction levels, or a concurrent combination thereof. Traction feedback (e.g. measured wheel slip) can indicate whether increasing the spring rate or decreasing the spring rate helps traction.

Global spring rate changes: In some examples, the mitigation action of controlling active suspension spring rate can comprise a global change of spring rate in dependence on the global traction-dependent parameter, that is, a common change for all wheels.

Damping rate: In some examples, a local or global mitigation action of controlling active suspension damping rate can comprise controlling the actuators 502 of the active suspension system 104 to modify damping rates. The mitigation action can change a relationship between sensed wheel travel velocity and a force request of the active suspension system 104, for example by setting a gain parameter.

Local damping rate changes: The damping rates can be changed differently for different wheels. For example, the mitigation action can increase/decrease damping rate at a subset of one or more wheels estimated to be low-traction wheels based on the relative traction levels, or can decrease/increase damping rate at a subset of one or more wheels estimated to be high-traction wheels based on the relative traction levels, or a concurrent combination thereof. Traction feedback (e.g. measured wheel slip) can indicate whether increasing the damping rate or decreasing the damping rate helps traction.

Global damping rate changes: In some examples, the mitigation action of controlling active suspension damping rate can comprise a global change of damping rate in dependence on the global traction-dependent parameter, that is, a common change for all wheels.

Steering: In some examples, a global mitigation action of controlling steering can comprise varying a steering angle at one or more steerable wheels in dependence on the global traction-dependent parameter. This is applicable when the vehicle 100 is moving forwards where the front wheels are the steerable wheels of the vehicle, or in either direction if the vehicle is provided with all-wheel steer, with each wheel being steerable. Varying the steering angle may comprise sawing the steering angle from left to right, to help the wheel to find traction. An electronic power-assisted steering system (EPAS) has the relevant actuator to perform this operation.

The steering angle variation could be enabled for particular surfaces such as non-grass surfaces, e.g. in dependence on surface information. The steering angle variation can be disabled in a terrain mode that is optimised for grass (e.g. grass-gravel-snow mode, GGS), where such sawing of the steered wheels may cause excessive disturbance of the prevailing surface, leading to unwanted trail erosion and ultimately reducing grip for subsequent vehicle traffic.

Local terrain mode selection: In some examples, a local mitigation action of controlling the terrain mode can comprise individually selecting a terrain mode for each individual subset of one or more wheels. Each subset of wheels can then receive its own set of parameters (e.g. torque/braking/suspension/steering).

Global terrain mode selection: In some examples, a global mitigation action of controlling the terrain mode can comprise selecting a terrain mode that is more suited to heterogeneous terrain than a currently selected terrain mode. Heterogeneous terrain refers to terrain having substantially different surface friction under each wheel. Some types of terrain mode can be more suited to heterogeneous surfaces even if they are not labelled as the correct terrain mode for the actual terrain surface. For example, the torque/braking/suspension/steering parameters of some terrain modes can be suited to heterogeneous surfaces.

The implementation phase as described in the above examples may continue until an exit condition is satisfied. An example exit condition can be based on the same sensed information as the trigger condition: an indication of a loss of traction of the vehicle 100 is no longer received or is below a threshold. As long as the vehicle 100 is making forward progress in the intended direction, another estimation phase may not be needed.

In some examples, an exit condition may comprise a determination that the vehicle 100 is stopping or braking.

When the exit condition is satisfied, the method 900 may loop back to before operation 906.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controller may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Terrain modes are defined. Different terrain modes control one or more vehicle subsystems according to different sets of configurations. A terrain mode generally refers to vehicle modes optimized for driving over particular driving surfaces. An example of a terrain mode is an off-road terrain mode, arranged to optimize the vehicle 100 for driving over off-road terrain such as may be required when traversing areas of grass, gravel, sand, mud or even crawling over rocks. Another example of a terrain mode is a surface vehicle optimization mode, arranged to optimize the vehicle 100 for driving over low friction surfaces such as snow or ice covered surfaces, either on or off road. A vehicle 100 may comprise a base on-road mode and/or a base surface vehicle optimization mode for regular surfaces, and may comprise a plurality of terrain modes for various surfaces and/or terrain.

A terrain mode and/or detection of a particular terrain type may configure one or more surface traction-related configurations such as a differential locking setting and/or a traction control setting. Additionally, or alternatively, other configurations could be adjusted such as: a suspension setting; a ride height setting; a suspension damper setting; a throttle response setting; a gear shift point setting; locking/lockable differential setting; a vehicle braking or traction control setting; a torque distribution setting; a torque shaping setting; or a steering weighting setting. The configurations may be predetermined or reconfigurable.

A manual user selection may comprise use of a human-machine interface input device 520. In some examples, a terrain mode may be changeable automatically.

One example HMI 520 is a terrain mode selector. In some embodiments, the terrain mode selector may be configured to allow a user to provide surface information by selecting from one a plurality of terrain modes including at least some of: sand; rock-crawl; grass-gravel-snow; mud-ruts; general (base mode).

In some embodiments, the terrain mode selector may be configured to allow a user to select an 'automatic' or 'auto' mode in which the vehicle 100, for example at control system 300, determines the most appropriate terrain mode at a given moment in time. This is achieved by obtaining from one or more sensors surface information including at least some of: rolling resistance; terrain roughness; gradient; wheel slip; wheel articulation; vehicle yaw. Suitable sensors include IMUs/accelerometers 522; 516, wheel speed sensors 512 or the like.

It will be appreciated that various changes and modifications can be made to the present invention without departing from the scope of the present application.

The blocks illustrated in the FIG. 9 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling an active suspension system of a vehicle to determine relative traction levels, the control system comprising at least one controller, wherein the control system is configured to:
control the active suspension system to change normal force through a first subset of one or more wheels;
determine a traction-dependent variable at each of the first subset of wheels to which known torque is applied;
control the active suspension system to change normal force through a second subset of one or more wheels;
determine a traction-dependent variable at each of the second subset of wheels to which known torque is applied; and
obtain an initial approximation of relative traction levels based on wheel speed measurements of the first and second subsets of wheels prior to changing normal force through the first and second subsets of wheels, wherein the traction-dependent variables determined during the normal force changes refine the initial approximation,
wherein the traction-dependent variables indicate relative traction levels.

2. The control system of claim 1, wherein the traction-dependent variables comprise wheel speed.

3. The control system of claim 1, wherein the traction-dependent variables are indicative of average traction levels measured over a plurality of repetitive changes of normal force.

4. The control system of claim 1, wherein the first subset of wheels comprises wheels at first diagonally-opposite corners of the vehicle, and wherein the second subset of wheels comprises wheels at second diagonally-opposite corners of the vehicle.

5. The control system of claim 4, configured to determine the traction-dependent variables while repetitively pulsing normal force through the first subset of wheels at a first phase and through the second subset of wheels at a second phase.

6. The control system of claim 5, wherein the second phase is 180 degrees offset from the first phase.

7. The control system of claim 1, wherein the first subset is a first wheel at a first corner of the vehicle, and wherein the second subset is a second wheel at a second adjacent corner of the vehicle.

8. The control system of claim 7, wherein the first corner is at a first lateral side of the vehicle and at a first longitudinal end of the vehicle, and wherein the second corner is at a second lateral side of the vehicle and at the first longitudinal end.

9. The control system of claim 8, configured to:
control the active suspension system to change normal force through a third wheel at the second lateral side and at a second longitudinal end of the vehicle;
determine a traction-dependent variable at the third wheel to which known torque is applied;
control the active suspension system to change normal force through a fourth wheel, wherein the fourth wheel is at the first lateral side and at the second longitudinal end; and
determine a traction-dependent variable at the fourth wheel to which known torque is applied,
wherein the traction-dependent variables at the first, second, third and fourth wheels indicate relative traction levels between the first, second, third and fourth wheels.

10. The control system of claim 9, configured to determine the traction-dependent variables while repetitively pulsing normal force through the first wheel at a first phase, through the second wheel at a second phase, through the third wheel at a third phase, and through the fourth wheel at a fourth phase.

11. The control system of claim 10, wherein
the second phase is 90 degrees behind the first phase,
the third phase is 90 degrees behind the second phase, and
the fourth phase is 90 degrees behind the third phase.

12. The control system of claim 1, configured to control the active suspension system to change normal force by repetitively pulsing normal force outside a wheel-hop inducing range.

13. The control system of claim 1, configured to enable the change of normal forces and to determine the traction-dependent variables in dependence on a received indication of a loss of traction of the vehicle.

14. The control system of claim 1, configured to enable the change of normal forces and to determine the traction-dependent variables in dependence on received surface information.

15. The control system of claim 1, configured to, in dependence on the relative traction levels, cause at least one of the following:
- controlling torque provided to at least one of the wheels;
- controlling friction braking for at least one of the wheels;
- controlling an active suspension spring rate;
- controlling an active suspension damping rate;
- controlling a regenerative braking setting;
- controlling steering at steerable wheels; or
- controlling selection of a terrain mode.

16. An active suspension system comprising the control system of claim 1.

17. A vehicle comprising the control system of claim 1.

18. A method of controlling an active suspension system of a vehicle to determine relative traction levels, the method comprising:
- controlling the active suspension system to change normal force through a first subset of one or more wheels;
- determining a traction-dependent variable at each of the first subset of wheels to which known torque is applied;
- controlling the active suspension system to change normal force through a second subset of one or more wheels; and
- determining a traction-dependent variable at each of the second subset of wheels to which known torque is applied; and
- obtaining an initial approximation of relative traction levels based on wheel speed measurements of the first and second subsets of wheels prior to changing normal force through the first and second subsets of wheels, the traction-dependent variables determined during the normal force changes refining the initial approximation,
- wherein the traction-dependent variables indicate relative traction levels.

19. A non-transitory storage medium containing instructions that, when executed by at least one processor, cause the at least one processor to perform the method of claim 18.

* * * * *